United States Patent [19]

Freeman et al.

[11] Patent Number: 5,035,805
[45] Date of Patent: * Jul. 30, 1991

[54] WATER DETECTION AND REMOVAL FOR INSTRUMENTS

[76] Inventors: Clarence S. Freeman; Katherine M. Freeman, both of Channelview, Tex.

[*] Notice: The portion of the term of this patent subsequent to May 31, 2005 has been disclaimed.

[21] Appl. No.: 352,662

[22] Filed: May 9, 1989

Related U.S. Application Data

[63] Continuation of Ser. No. 173,304, Mar. 25, 1988, abandoned, which is a continuation-in-part of Ser. No. 735,792, May 17, 1985, Pat. No. 4,747,960.

[51] Int. Cl.$^5$ .................. B01D 15/00; B01D 53/14
[52] U.S. Cl. .................. 210/689; 55/35; 210/282
[58] Field of Search .................. 55/29–35; 174/14 R; 210/689, 282

[56] References Cited

U.S. PATENT DOCUMENTS

| | | | |
|---|---|---|---|
| 1,475,548 | 11/1923 | Hunt | 252/194 |
| 2,214,925 | 9/1940 | Guthrie | 252/2 |
| 2,352,158 | 6/1944 | Bishop | 174/14 |
| 2,578,324 | 12/1951 | Southwick | 183/4.8 |
| 3,272,742 | 9/1966 | Polishuk | 252/28 |
| 3,539,364 | 6/1971 | Dean et al. | 162/146 |
| 3,661,815 | 5/1972 | Smith | 260/17.4 |
| 3,830,752 | 4/1975 | Premo | 210/54 |
| 3,990,872 | 11/1976 | Cullen | 55/274 |
| 4,036,360 | 7/1977 | Deffeyes | 206/204 |
| 4,124,116 | 11/1978 | McCabe | 206/204 |
| 4,242,206 | 12/1980 | Estabrooke | 210/489 |
| 4,295,987 | 10/1981 | Parks | 252/194 |
| 4,419,236 | 12/1983 | Hsu | 210/689 |
| 4,437,082 | 3/1984 | Walsh et al. | 336/58 |
| 4,454,055 | 6/1984 | Richman et al. | 252/194 |
| 4,588,505 | 5/1986 | Walley et al. | 210/502.1 |
| 4,594,082 | 6/1986 | Catherwood | 55/316 |
| 4,747,960 | 5/1988 | Freeman et al. | 210/689 |
| 4,758,350 | 7/1988 | Pitts et al. | 210/484 |

OTHER PUBLICATIONS

Diagnetics Technical Bulletin Insulgard TB/1G 84-5.
Diagnetics Technical Bulletin Hydrolock TB/HL 84-5.

*Primary Examiner*—Ivars Cintins
*Attorney, Agent, or Firm*—Vaden, Eickenroht, Thompson & Boulware

[57] ABSTRACT

A bonded woven fabric compartment containing a super absorbent polymer which absorbs atmospheric water, condensate and water in oil for use in enclosures containing instrumentation and electronic equipment. The polymer is a granular form that when it absorbs water swells and does not migrate out of the compartment.

15 Claims, 1 Drawing Sheet

WATER DETECTION AND REMOVAL FOR INSTRUMENTS

BACKGROUND OF THE INVENTION

This application is a continuation of co-pending application Ser. No. 07/173,304, filed on Mar. 25, 1988, now abandoned; which is a continuation-in-part to U.S. Ser. No. 735,792 entitled "Water Absorbent Packet" filed on May 17, 1985 issued as U.S. Pat. No. 4,747,960 on May 31, 1988.

In the area of usage of super water absorbent compositions, the primary applications have been found in the personal products and water vapor absorption from an environment desired to be kept free of humidity. In manufacturing operations, automation has produced instruments which automatically monitor plant operations. Instruments with sensors and read-out devices have been developed to monitor various processes and conditions such as flow rates, pressure, mixture rates, temperature, and feed rates. Some instruments not only provide readouts but also actuate equipment in response to the control process steps desired.

There is a great variety of types, designs, size and shape of these instruments. Many of the instruments are installed so that the data display, electronic boards and the like are contained in an enclosure or compartment. The instrument enclosures are often exposed to humidity and water condensate, even if there are seals around the compartments, the enclosures must be opened to view the data display which exposes the instruments to moisture. Many instruments are sensitive to any type of moisture and must be maintained and calibrated carefully.

Some instrument housings are filled with oil, such as dielectric oil, which protect the sensitive internal parts from moisture damage. These instrument casings are subject to invasive water and atmospheric humidity which can penetrate the oil and adversely affect the internal instrumentation.

In cable television the same type of enclosure is used for amplification equipment which is enclosed in a housing in the environment. The amplification equipment is electronic boosters which assure a good signal on the line at points remote to the main signal transmitters. The enclosures are typically aluminum housings. The housings are sealed but often the air sealed inside contains moisture which can condense with temperature change to cause problems with the electronic amplification equipment. Also the seal of the housing can break causing entry of moisture. Since the amplifier housings are outdoors, they are subject to all the atmospheric temperature and humidity changes.

Instruments are sensitive to humidity as well as water condensate. Water vapor and condensate can cause corrosion and damage to equipment and miscalibration resulting in problems in the plant. To prevent moisture damage industry uses various types of materials such as silica gels, molecular sieve and dried clays which have a limited absorptive capacity as compared to the method of this invention.

Various desiccants have been developed and used for removal of water vapor from ambient air. These packets of desiccants are used in packaging products sensitive to moisture and are shown in Cullen, U.S. Pat. No. 3,990,872 and Deffeyes, U.S. Pat. No. 4,035,360. Desiccant-like materials have been packaged in plastic webbing for use in liquids to remove water with a water absorption of 40% by weight in products known as Insulgard and Hydrolock by Diagnetics, Inc. of Tulsa, Okla. This degree of water absorption is magnitudes less than the present invention. The Diagnetics, Inc. products have a water removal quality by squeezing that is not a feature of the present invention which traps the moisture and cannot be squeezed out.

The super water absorbent materials have been developed primarily with the personal products and household emphasis on practical applications. The super absorbent materials have been developed for use in diapers, sanitary napkins, paper towel and wipes. Often these products utilize carboxymethyl cellulose or its derivatives as the water absorbent compound. An example is U.S. Pat. No. 3,589,364 to Dean et al. issued June 29, 1971 which discussed the uses of carboxymethyl cellulose fibers as absorbents for a number of personal products, but also cites a use for a cartridge or cylinder packed with the fibers for absorbing and removing water present in a hydrocarbon fluid by passing the fluid through the cylinder.

Other super water absorbent compounds are disclosed in U.S. Pat. No. 3,661,815 to Smith, issued May 9, 1972, for alkali metal carboxylate salts of starch-polyacrylonitrile graft copolymers with stated utility in the personal and hygiene products area. Another absorbent copolymer which has stated utility for diapers and catamenials is a cross linked sodium polyacrylate disclosed in U.S. Pat. No. 4,295,987 to Parks, issued Oct. 20, 1981.

SUMMARY OF THE INVENTION

The present invention is to utilize a highly water absorbent composition such as a "super" absorbent polymer or copolymer which is packaged in a very adaptable form for usage in enclosures, compartments and systems containing instrumentation. The packet construction and composition can be used in oil filled instrument housings. The polymer selectively absorbs water and not the oil. The same packet can be used in a housing in atmospheric conditions.

The packets contain the super absorbent composition totally enclosed in a compartment so that the absorbent composition is confined in the compartment. The packet is designed so that in an oil environment the polymer will not migrate out of the compartment. For atmospheric use the super absorbent packet is placed on a ledge or shelf inside the enclosure and is sized so that it will not interfere with any of the working parts. The same packet can be placed in service under a variety of conditions.

The packets are made of sheets of material which are bonded or sewn together. The material can be cut and bonded in any shape necessary for use in the vessel or container of choice and offers a high degree of flexibility of choice of usage.

Due to the super absorbing of the polymers used, the dry volume of absorbent material used is relatively small. The size and number of packets used in an application can be easily adapted due to the absorbency of the polymers and the flexibility of the size and shape of the packet. The water is contained in the super absorbent polymers and does not squeeze or leak out.

In an application where the packet can be viewed, the invention provides a visual check for invasive water because the super absorbent material will swell inside the packet. The swelling from water absorption will be seen indicating to the viewer the presence of water in the instrument enclosure.

DESCRIPTION OF THE DRAWINGS

The drawings show one embodiment of the invention for exemplary purposes.

DESCRIPTION

The super absorbent polymers used in the invention are confined in a compartment of woven or porous material which allows the penetration of fluid or moisture through the material. The packet can have one or more compartments. The super absorbent must be retained in the compartments in the packet and therefore cannot be of such a fine consistency that will escape through the interstices of the material. Similarly, when the absorbent material is contacted with water it will not migrate out of the compartment. This is particularly important around sensitive instruments and equipment where particles of foreign material would affect the performance.

The material or fabric must be woven or sufficiently porous to allow passage of the liquid or moisture around the water absorbent material. The packets absorb water condensate and atmospheric humidity. A cotton or cotton and polyester fabric has been found to be suitable for use.

The fabric is cut to the desired shape and size for the particular system enclosure or compartment needed. The size and shape of the packet will be adapted to the enclosure. The packet can be placed on a ledge or shelf, inside the enclosure. It would be possible to hang the packet on a hook or to clip the packet inside the enclosure. In an oil filled housing the packet can sit on the bottom of the inside of the housing or be secured to the housing.

The size of the packet and number of compartments is relative to the amount of water absorption necessary. A packet may be placed in an area where condensate has been observed to gather. Multi-compartment packets have been found to have increased effectiveness in water absorption.

Figure 1:
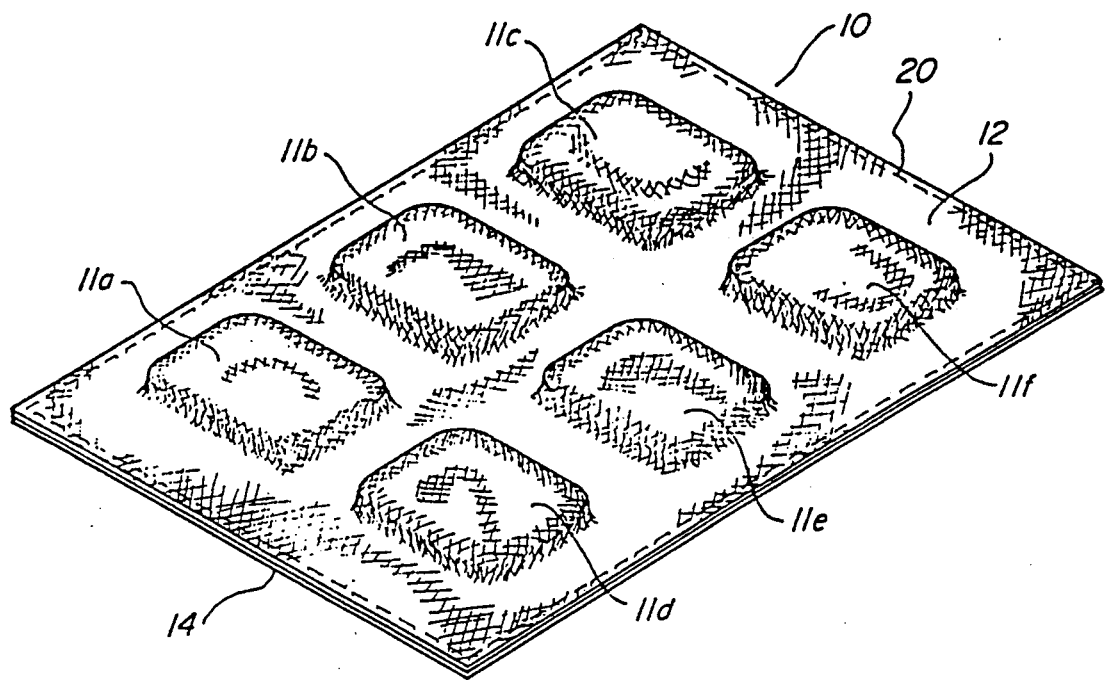
FIG. 1 is the top view of one embodiment of a packet with six compartments of water absorbent material.
Figure 2:
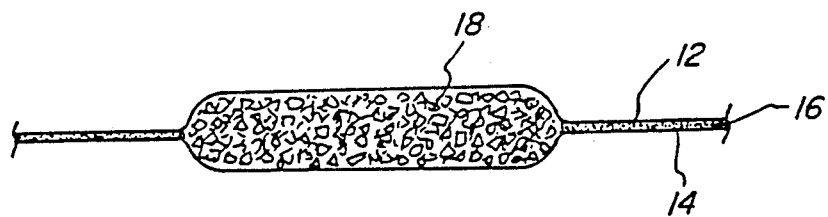
FIG. 2 is a cross-sectional view of one compartment with a heat fusible adhesive.

FIG. 1 shows a multi-compartment packet 10 of this invention. The packet is made of an upper and lower sheet of fabric. The upper layer of fabric 12 is bonded to a lower layer of fabric 14. In FIG. 1 a multiple compartment embodiment is shown, with six compartments 11a-11f. FIG. 2 shows an embodiment with a bonding material 16 which fuses the two layers of fabric 12 and 14 together. A stitched reinforcing seam 20 may be added on the outer edge of packet 10 for additional strength in addition to the bonding. If desired, stitching can be done around the compartments to provide additional means for segregating the absorbent in the compartments. The super absorbent material is shown as granular material 18.

Figure 3:
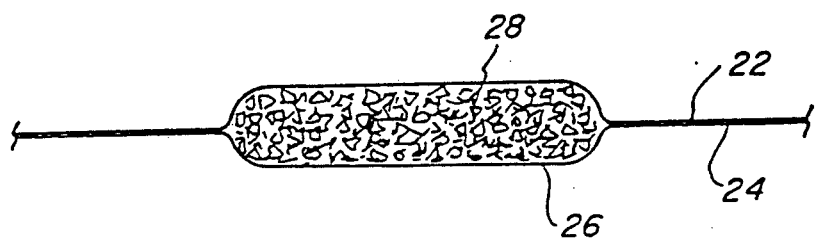
FIG. 3 is a cross-sectional view of one compartment with heat bonding method.

FIG. 2 shows a cross-section of a compartment before the super absorbent material has contacted water. As granular material 18 contacts and absorbs water it expands in volume to show a visible swelling of the pouch. Fabric layers 12 and 14 will stretch to some extent after the granular material has expanded from water absorption to fill the cavity of the compartment. FIG. 3 shows a cross-section of a compartment bonded using the fusion properties of a polyester composition fabric. At approximately 350° F. polyester will heat fuse to itself to form the compartments. In FIG. 3 upper fabric layer 22 and lower fabric layer 24 have been heat fused in a pattern to cause the formation of compartment 26. Granular absorbent 28 is shown in compartment 26.

EXAMPLE 1

The following packet construction was made for use in an instrument enclosure box with a typical size of 18 inches in height, 24 inches in width and 10 inches in depth. Two pieces of 65% polyester and 35% combed cotton fabric were trimmed to 3 inch by 6 inch rectangles. The fabric pieces were sewn together with a standard thread to form two compartments of approximately 3 inch by 3 inch squares. Enclosed in each of the compartments is approximately one and one-half teaspoons of absorbent for a total three teaspoons of super absorbent such as sodium poly-2-propenoate granular absorbent, a Dow Chemical product known as "DRYTECH." Other super absorbent hydrocarbon polymers can be used such as salts of polymeric carboxylates, and carboxymethyle cellulose.

The outer edges of the polyester and cotton fabric squares were stitched together for reinforcement. It was found that the water absorbent sodium poly-2-propenoate absorbs at least fourteen times its own volume of water. Upon absorption of a significant amount of water the material becomes a jell, but does not migrate out of the compartments. The packets, have been observed experimentally and in the field for at least 120 days without migration of the absorbent outside the compartment. The jell cannot be squeezed to release the entrapped moisture. Also, the swelling of the absorbent is quite noticeable visually.

EXAMPLE 2

A 6 compartment packet with the dimensions 7 inches by 7 inches was constructed using the same method and cotton polyester fabric described in Example 1. The two sheets of fabric were fused with a heat fusible adhesive to form six compartments and reinforcement stitching was made around the edges. The water absorbent material was salts of carboxylate product manufactured by Stockhausen. Granules weighing ½ ounce were placed in each compartment. This packet absorbed the same amount of water by proportion when tested under the same conditions as described in Example 1.

EXAMPLE 3

A 2 compartment packet with the same dimensions and the same fabric of Example 1 was constructed. The heat fusible adhesive was not used and the compartments were made by heat fusing the polyester-cotton fabric to itself by applying heat to the fabric sheets at about 350° F. The heat fusion process eliminates the necessity of a separate adhesive of the bonding process. The compartments were filled with the granular absorbent DRYTECH and the packet functions in the same manner described in Example 1.

EXAMPLE 4

Another embodiment of the packet can be made from 100% cotton fabric. Combed and unsized cotton fabric was cut into sheets as described in Example 1. Since the 100% cotton fabric does not have any polyester content, a heat fusible bonding material needs to be used to form the compartments. A packet of the size and shape described in Example 1 was prepared using the Dow "DRYTECH" sodium poly-2-propenoate granular absorbent in the amounts and manner described in Example 1. The packet of combed, unsized cotton performed as previously discussed in Example 1.

Super absorbents used in this method are in granular form and can be carboxymethyl cellulose, sodium poly-2-propenoate, salts of carboxylate or other forms of super absorbent polymers. The amount of super absorbent used depends on the size of the compartment of the packet. There should be room in the compartment containing dry super absorbent to allow for swelling upon water absorption. In high humidity environments larger packets or multiple packets can be used to protect the equipment.

Although the invention has been characterized in terms of the above-described embodiments and methods, those skilled in the art who have the benefit of this disclosure will recognize that changes can be made to the above-described embodiments and methods that do not constitute a departure from the spirit of the present invention. Such changes are intended to fall within the scope of the present invention as set out in the following claims.

What is claimed is:

1. A method of absorbing moisture in the form of water vapor, water condensate, or invasive liquid water from within an enclosure containing moisture sensitive electronic instruments or electronic equipment comprising:
    packaging a water absorbent polymer into multiple compartments between sheets of a material that is sufficiently porous to allow passage of water in liquid or vapor form that are cut and bonded to form a packet for use in the enclosure from which moisture is to be absorbed;
    inserting the packet into an enclosure containing moisture sensitive electronic instruments or electronic equipment from which moisture is to be absorbed;
    allowing the packet to remain within the enclosure to absorb moisture in the form of water vapor, water condensate, or invasive liquid water therefrom; and
    when the packet is swollen from absorption of water, replacing the packet with another packet.

2. The method of claim 1 in which the packet is inserted into the enclosure at a location in which any one or more compartments comprising the packet are exposed to any moisture which may be present inside the enclosure and in which the packet does not interfere with the working parts inside the enclosure.

3. The method of claim 2 additionally comprising securing the packet in the location.

4. The method of claim 1 additionally comprising observing the packet for swelling indicating water absorption.

5. The method of claim 1 additionally comprising preventing the escape of the water absorbent polymer from the compartments of the packet.

6. A method of absorbing moisture in the form of water vapor, water condensate, or invasive liquid water from the inside of a closed housing or other enclosure containing a moisture sensitive electronic component comprising:
    cutting a sheet comprised of individual, separable compartments into a packet of selected size and shape for fitting within a closed housing containing a moisture sensitive electronic component from which moisture is to be absorbed from a sheet comprised of upper and lower layers of a material that is sufficiently porous to allow passage of water in liquid or vapor form bonded together at intervals defining a plurality of individual compartments in the sheet, each of the compartments containing a water absorbent polymer, by cutting the upper and lower layers of material between compartments;
    placing the sized and shaped packet in the closed housing from which moisture is to be absorbed in a location selected so as not to interfere with the working parts inside the housing but in which the water absorbent polymer contained in the one or more compartments comprising the sized and shaped packet is exposed to any moisture which may be present inside the housing;
    allowing the sized and shaped packet to remain within the housing to absorb moisture in the form of water vapor, water condensate, or invasive liquid water therefrom; and
    replacing the sized and shaped packet that has absorbed moisture with another sized and shaped packet.

7. The method of claim 6 additionally comprising securing the sized and shaped packet to a selected location inside the housing.

8. The method of claim 6 additionally comprising observing the sized and shaped packet for swelling indicating water absorption.

9. The method of claim 6 additionally comprising preventing the escape of the water absorbent polymer from the enclosed compartments comprising the packet.

10. The method of claim 6 wherein the number of enclosed compartments comprising the packet is increased to increase the effectiveness of water absorption.

11. A method of detecting and removing water from an enclosed compartment containing electronic components or equipment sensitive to humidity or water condensate with a water absorbent packet comprising:
    sizing a packet comprised of upper and lower sheets of water penetrable material bonded together to form multiple compartments therebetween, the compartments being separable to individual compartments by cutting the upper and lower sheets to form a packet having a desired size and shape of fit within an enclosed compartment containing moisture sensitive electronic components or equipment from which liquid or water vapor is to be absorbed, each of the individual compartments containing a water absorbent polymer;
    inserting the sized packet into the enclosed compartment;
    observing the inserted sized packet for swelling indicating absorption of liquid water or water vapor; and
    replacing the swollen packet when the water absorbent polymer in the compartments of the swollen packet is saturated with water.

12. The method of claim 11 wherein the packet is sized by cutting the upper and lower sheets between the individual compartments.

13. The method of claim 11 additionally comprising securing the inserted packet to a selected location inside the enclosed compartment.

14. The method of claim 11 wherein the sized packet is inserted into the enclosed compartment in a location selected so as not to interfere with the working parts inside the enclosed compartment but in which the water absorbent polymer contained within the individual compartments is exposed to the liquid water or water vapor which may be present inside the enclosed compartment.

15. The method of claim 11 wherein the number of enclosed compartments comprising the packet is increased to increase the quantity of water to be absorbed.

* * * * *